(12) United States Patent
Wiley et al.

(10) Patent No.: US 11,926,553 B2
(45) Date of Patent: Mar. 12, 2024

(54) SELF-LEARNING FIBER PROCESSING SYSTEM AND METHOD

(71) Applicant: 3SAE Technologies, Inc., Franklin, TN (US)

(72) Inventors: Robert G. Wiley, Franklin, TN (US); John Lower, Franklin, TN (US); Brett Clark, Whites Creek, TN (US)

(73) Assignee: 3SAE TECHNOLOGIES, INC., Franklin, TN (US)

( * ) Notice: Subject to any disclaimer, the term of this patent is extended or adjusted under 35 U.S.C. 154(b) by 0 days.

(21) Appl. No.: 18/126,515

(22) Filed: Mar. 27, 2023

(65) Prior Publication Data

US 2023/0339798 A1    Oct. 26, 2023

Related U.S. Application Data

(63) Continuation of application No. 16/585,208, filed on Sep. 27, 2019, now Pat. No. 11,613,494.

(60) Provisional application No. 62/737,233, filed on Sep. 27, 2018.

(51) Int. Cl.
*C03B 37/025* (2006.01)
*C03B 37/028* (2006.01)
*C03B 37/15* (2006.01)

(52) U.S. Cl.
CPC ........ *C03B 37/0253* (2013.01); *C03B 37/028* (2013.01); *C03B 37/15* (2013.01); *C03B 2203/40* (2013.01); *C03B 2205/40* (2013.01)

(58) Field of Classification Search
CPC .................................................. C03B 37/0253
See application file for complete search history.

(56) References Cited

U.S. PATENT DOCUMENTS

| | | | |
|---|---|---|---|
| 5,707,564 | A | 1/1998 | Rivoallan |
| 6,011,638 | A | 1/2000 | Mamyshev et al. |
| 7,483,615 | B2 | 1/2009 | Mihailov et al. |
| 8,056,368 | B2 | 11/2011 | Harper et al. |
| 9,417,398 | B2 | 8/2016 | White et al. |
| 9,829,629 | B2 | 11/2017 | Horth et al. |
| 2007/0201802 | A1 | 8/2007 | Mihailov et al. |
| 2009/0320527 | A1 | 12/2009 | Harper et al. |

(Continued)

FOREIGN PATENT DOCUMENTS

WO    2005038539    4/2005

OTHER PUBLICATIONS

Extended European Search Report dated May 18, 2022 issued in corresponding European Application No. 19865824.7.

(Continued)

*Primary Examiner* — Cynthia Szewczyk
(74) *Attorney, Agent, or Firm* — Onello & Mello, LLP

(57) ABSTRACT

Provided is a system for and a method of processing an optical fiber, such as tapering an optical fiber. The method includes receiving fiber parameters defining characteristics of an optical fiber, modeling an idealized fiber based on the fiber parameters to establish modeled data, and establishing processing parameters. A processing operation is performed on the optical fiber according to the processing parameters to produce a resultant fiber. Aspects of the resultant fiber are measured to establish measured data. The measured data and the modeled data are normalized to a common axis and a difference between the two is determined. The processing parameters are adjusted based on the differences.

20 Claims, 9 Drawing Sheets

(56) References Cited

U.S. PATENT DOCUMENTS

| | | |
|---|---|---|
| 2013/0236153 A1 | 9/2013 | Rochette et al. |
| 2014/0233886 A1 | 8/2014 | White et al. |
| 2015/0177732 A1 | 6/2015 | Rochette et al. |
| 2016/0341896 A1 | 11/2016 | Horth et al. |
| 2018/0051389 A1 | 2/2018 | Maxwell et al. |
| 2020/0102242 A1 | 4/2020 | Wiley et al. |

OTHER PUBLICATIONS

International Search Report and Written Opinion dated Dec. 19, 2019 issued in corresponding International Application No. PCT/US19/53383.

Mullaney et al. "Monitoring techniques for the manufacture of tapered optical fibers", Applied Optics, vol. 54 No. 28 (Oct. 1, 2015), pp. 8531-8536.

200

Run in example

| Line # | Pull Speed | Feed Speed | ROF Speed | Arc Power |
|---|---|---|---|---|
| 0 | -350 | -350 | 0 | 1100 |
| 1 | -350 | -350 | 0 | 1100 |
| 2 | -350 | -350 | 0 | 1100 |
| 3 | -350 | -350 | 0 | 1100 |
| 4 | -350 | -350 | 0 | 1100 |
| 5 | -350 | -350 | 0 | 1100 |
| 6 | -350 | -350 | 0 | 1100 |
| 7 | -350 | -350 | 0 | 1100 |
| 8 | -350 | -350 | 0 | 1100 |
| 9 | -350 | -350 | 0 | 1100 |
| 10 | -350 | -350 | 0 | 1100 |

(a)

Down Taper example

| Line # | Pull Speed | Feed Speed | ROF Speed | Arc Power |
|---|---|---|---|---|
| 150 | -363 | -337 | 0 | 1076 |
| 151 | -363 | -337 | 0 | 1076 |
| 152 | -364 | -337 | 0 | 1075 |
| 153 | -364 | -337 | 0 | 1075 |
| 154 | -364 | -336 | 0 | 1074 |
| 155 | -365 | -336 | 0 | 1074 |
| 156 | -365 | -336 | 0 | 1073 |
| 157 | -365 | -335 | 0 | 1073 |
| 158 | -365 | -335 | 0 | 1072 |
| 159 | -366 | -335 | 0 | 1072 |
| 160 | -366 | -335 | 0 | 1071 |

(b)

Waist example

| Line # | Pull Speed | Feed Speed | ROF Speed | Arc Power |
|---|---|---|---|---|
| 1030 | -700 | -146 | 0 | 850 |
| 1031 | -700 | -146 | 0 | 850 |
| 1032 | -700 | -146 | 0 | 850 |
| 1033 | -700 | -146 | 0 | 850 |
| 1034 | -700 | -146 | 0 | 850 |
| 1035 | -700 | -146 | 0 | 850 |
| 1036 | -700 | -146 | 0 | 850 |
| 1037 | -700 | -146 | 0 | 850 |
| 1038 | -700 | -146 | 0 | 850 |
| 1039 | -700 | -146 | 0 | 850 |
| 1040 | -700 | -146 | 0 | 850 |

(c)

Up Taper example

| Line # | Pull Speed | Feed Speed | ROF Speed | Arc Power |
|---|---|---|---|---|
| 1190 | -391 | -313 | 0 | 1033 |
| 1191 | -390 | -314 | 0 | 1035 |
| 1192 | -389 | -315 | 0 | 1036 |
| 1193 | -388 | -316 | 0 | 1038 |
| 1194 | -387 | -316 | 0 | 1039 |
| 1195 | -386 | -317 | 0 | 1040 |
| 1196 | -385 | -318 | 0 | 1042 |
| 1197 | -384 | -319 | 0 | 1043 |
| 1198 | -383 | -320 | 0 | 1045 |
| 1199 | -382 | -320 | 0 | 1046 |
| 1200 | -381 | -321 | 0 | 1047 |

SELF-LEARNING FIBER PROCESSING SYSTEM AND METHOD

RELATED APPLICATIONS

This application is a continuation application of U.S. Ser. No. 16/585,208, filed Sep. 27, 2019, and entitled SELF-LEARNING FIBER PROCESSING SYSTEM AND METHOD, which claims benefit of U.S. Provisional Application No. 62/737,233, filed on Sep. 27, 2018, and entitled SELF-LEARNING FIBER PROCESSING SYSTEM AND METHOD, which is hereby incorporated by reference in its entirety.

FIELD OF INTEREST

The present inventive concepts relate to the field of optical fiber processing, for example, systems and machines that splice, strip, taper and etch glass optical fibers.

BACKGROUND

Various types of devices and systems have been made to process optical fibers for use in communication networks and systems, as well as for use in optical components. Processing optical fibers can include one or more of stripping, cleaning, cleaving, splicing, tapering, etching and so on.

Most common optical fibers are 80 µm to 125 µm in diameter (not including outer coatings). However, some applications, such as high-power fiber lasers, require fibers up to 1 mm or more in diameter. Fibers having a diameter greater than 200 µm may be considered to be large diameter fibers (LDFs) or large core fiber.

Tapering, as an example, can take different forms, such as single direction tapering or bi-directional tapering. Both methods alter the fiber diameter to form a smaller diameter portion in between the left and right fiber holding platforms. The smallest diameter portion is known as the taper waist. A "taper ratio" is commonly defined as the ratio of the start diameter to the waist diameter. Single direction tapering is accomplished by translating a fiber through a stationary heat source. Both the left and right fiber holding platforms travel in the same direction, but with the pulling platform traveling a controlled amount faster than the feeding platform, thereby creating the desired taper shape. Bidirectional tapering is accomplished by moving the left and right fiber holding platforms outward (opposite directions) as the heat source rapidly sweeps back and forth along the fiber axis many times.

Tapering is performed in a machine or station that has platforms or holders for securing two portions of a fiber or fibers, where a portion to be tapered is disposed between the two secured portions so that the fiber is taught. The tapering machine applies heat to the portion to be tapered and one or both of the securing means are translated away from the other securing means by a delta in speed and/or direction. In some tapering machines, electrodes are used to form heated plasma arcs that provide the tapering heat source. When sufficient heat is applied, the fiber softens in the heated area so that the translation forces gradually stretch the heated portion in a controlled manner to achieve a taper. As examples, temperature and translation speeds can be controlled to achieve a desired taper shape.

Some tapering machines allow a user to input specifications for a taper, whether a single directional or bi-directional taper. FIG. 1 shows an example of a user interface 100 of a tapering machine for inputting specifications for either a single direction or a bidirectional taper of a fiber. The user interface includes a set of fields, mechanisms, and/or devices 110 for entering key fiber parameters of the resultant tapered fiber. Table 1 below shows some relevant parameters.

TABLE 1

| Fiber Parameter List | |
|---|---|
| Start Diameter | This is the diameter (µm) of the fiber before tapering. |
| Start Speed | The speed (µm/s) of the movement of the left and right platforms. |
| Run-in/Run-out | The distance traveled (µm) while the left and right platforms are moving in the same direction at the Start Speed. These are transitional motions that do not affect the diameter. |
| Down-Taper Length | This is the target length (µm) of the diameter change from the original Fiber Diameter to the Waist Diameter. |
| Waist Length | This is the target distance (µm) of fiber length that maintains the programmed Waist Diameter. |
| Waist Diameter | This is target diameter (µm) over the entire waist length. |
| Up-Taper Length | This is the target length (µm) of the diameter change from the Waist Diameter back to the original Fiber Diameter. |
| Start Power/ Waist Power | The amount of arc power (heat in arbitrary units) to apply to the fiber. The Waist Power is typically lower than the start power because the amount of thermal mass (glass) in the heat zone decreases as the taper is created. For small taper ratios (small percentage change between start diameter and waist diameter) (i.e., 1000 µm tapered down to 900 µm) the Start Power and Waist Power can be the same value. |
| Capillary ID | This is the pre-tapered value of the inner diameter of the glass being tapered. This is only relevant if the fiber or other glass rod being tapered has an ID (such as a capillary tube). |
| Waist Capillary ID | This is the post-tapering value of the inner diameter of the glass being tapered. This is only relevant if the fiber or other glass rod being tapered has an ID (such as a capillary tube). |

In FIG. 1, the fiber 10 has an original (pre-tapered) diameter labelled "A." Up-taper and down-taper segments of the taper 1, 2 and the waist segment 3 are all formed during the tapering process and the general shape of each taper segment is defined by the input values. The shape of each of the segments of the taper will typically contain non-idealized and unintended imperfections. An example of this would be a localized increase or decrease of one or more of the taper diameters as compared to a defined intended shape. Another example would be a slight slope to the waist section causing one end of the waist to be a slightly different diameter than the opposing end. These non-idealized and unintended imperfections can be caused by very subtle variances in the temperature of the heat source and/or the speed of the translating holding platforms.

The above noted parameters are input via the user interface 100, and the user input fields, devices, and/or mechanisms 110. The tapering machine processes (or tapers) the fiber 10 according to the input parameters. The tapering machine can be configured to process the user inputs to convert the user defined taper parameters list from Table 1 and FIG. 1 into a table format usable by the hardware driving the platforms and heat source or sources. In FIG. 1, the zero values in the Up-taper length and Run-out fields indicate that the user has input parameters indicating a single direction taper and that the up-taper segment length (along the fiber axis) should be as abrupt as mechanically possible.

FIG. 2, including tables (a) through (d), shows an example of the taper tables 200 that can be generated based on the user input parameters for making a single direction taper. These hardware values are examples based on the examples of user input of FIG. 1. Speeds are in μm/sec (micrometers/second), where the minus sign only defines the direction of travel of a platform. By definition, the ROF speed should always be 0 for a single direction taper since the heat source does not move during the tapering process.

Table (a) shows the hardware values used for the run-in portion of the taper, starting with the original fiber. Table (b) shows the hardware values used for the down-taper portion of the tapering operation. Table (c) shows the hardware values used for the waist portion of the tapering operation. And Table (d) shows the hardware values for the up-taper portion of the tapering operation. A table of the run-out portion of the tapering operation is not shown.

Each line of the tables represents a fixed amount of time (typically 50 ms per line/20 lines per second), or unit of time. The values in the Line #column define the index of each individual 50 ms time slot or unit. In the Run-in example of Table (a), run-in occurs for the first 57 lines of the table (only 10 shown) representing the first 2.85 seconds of the process. Since both the Pull and Feed platforms are translating at the same speed and in the same direction, no tapering occurs during the run-in process in accordance with the definition above. Given the translation speed of −350 μm/sec for 2.85 seconds equates to a total distance traveled during the run in of 997.5 μm. This value (rounded) corresponds with the requested Run-in length of 1000 μm shown in FIG. 1.

Referring to the Down-Taper example of Table (b), during the down-taper operation the Pull Speeds are increasing and the Feed Speeds are decreasing, where the Pull Speeds are greater than the Feed Speeds. But a down-taper could also be accomplished by maintaining the Feed Speed while increasing the Pull Speed. When the ratio of the Pull Speed to the Feed Speed is not constant a taper is formed. These hardware values are examples based on the examples of user input of FIG. 1. Speeds are in μm/sec (micrometers/second), where the minus sign only defines the direction of travel of a platform. By definition, the ROF speed should always be 0 for a single direction taper since the heat source does not move during the tapering process.

Referring to the Waist example of Table (c), during the waist formation portion of the process, the Pull Speed and the Feed Speed stay constant, with the Pull Speed being greater than the Feed Speed to create the waist portion of the fiber having a uniform diameter over the waist portion.

Referring to the Up-Taper example of Table (d), during an up-taper operation the Pull Speeds are decreasing and the Feed Speeds are increasing, where the Pull Speeds are greater than the Feed Speeds. But an up-taper could also be accomplished by maintaining the Feed Speed while decreasing the Pull Speed.

To perform a fiber tapering operation, the user places a fiber in the tapering machine and inputs the desired taper parameters, the tapering machine generates the hardware values table (collectively called "taper table" or "taper tables"), and runs the process defined by the taper table(s). The input parameters, and taper tables, define characteristics of an intended resultant fiber taper. There are many reasons that the resultant fiber taper will not exactly match the desired taper shape. The design of the product hardware and software attempts to mitigate the impact of variables that can adversely affect the resultant fiber taper, with varying degrees of success. These variables can include, a diameter of heat zone along fiber axis and its consistency over time, a peak temperature at a center of the heat zone and its consistency over time, a variance in thermal load of the fiber as its being tapered, glass flow dynamics, mechanical motion imperfections over time or location (microns are relevant), and starting fiber diameter consistency. The thermal amplitude, across the entire heat diameter, including the peak, are collectively known as the "thermal profile" of the heat zone.

FIG. 3 shows a resultant fiber taper measurement graph 300 showing a plot 310 of a measurement of a fiber taper diameter over time according to the prior art. In FIG. 3, the x-axis represents the fiber length in μm, while the y-axis represents fiber diameter in μm. In this figure, the fiber is tapered from about 1,000 μm to about 500 μm, over a length of about 15,000 μm. The resultant taper in FIG. 3 does not precisely match the desired taper (see FIG. 6).

There is a need for methods and systems that can perform more accurate fiber processing. For example, there is a need for methods and systems that provide better quality tapers that precisely conform to user specifications. It would also be advantageous to have a fiber processing (or tapering) machine that can correct for non-idealized and unintended imperfections in a resultant fiber taper.

SUMMARY

In accordance with aspects of the inventive concepts, provided is a method of processing an optical fiber by a fiber processing apparatus, comprising: receiving fiber parameters defining characteristics of an idealized resultant optical fiber; modeling the idealized resultant fiber based on the fiber parameters to establish modeled data; from the fiber parameters, establishing processing parameters; performing an operation on the optical fiber according to the processing parameters to produce a resultant fiber; measuring aspects of the resultant fiber to establish measured data; normalizing the measured data and the modeled data to a common axis and determining a difference between the measured data and the modeled data; and adjusting one or more of the processing parameters and, optionally, repeating the processing operation to form a new resultant fiber.

In various embodiments, the method can further comprise repeating various steps until the difference does not exceed a predetermined threshold.

In various embodiments, the processing operation is a tapering operation.

In various embodiments, the fiber parameters define a shape of a taper of the resultant fiber.

In various embodiments, the fiber parameters include parameters for a start diameter, a down-taper length, and/or a waist diameter.

In various embodiments, the fiber parameters further include parameters for an up-taper length, a waist diameter and/or a waist length.

In various embodiments, the fiber parameters include parameters for at least one taper speed.

In various embodiments, establishing processing parameters includes generating a table of processing parameters based on the fiber tapering parameters.

In various embodiments, adjusting one or more of the processing parameters includes updating one or more parameters in the table of processing parameters.

In various embodiments, post tapering measured data includes a plot of fiber diameter over length.

In various embodiments, fiber diameter over length measurement data is collected in real time as the taper is created.

In various embodiments, the fiber parameters include parameters for at least one fiber holding platform's position over time.

In various embodiments, the method further comprises storing the adjusted parameters for future use with other optical fibers.

In various embodiments, the fiber is a large diameter fiber.

In various embodiments, the fiber is a fiber bundle.

In various embodiments, the method further comprises storing the processing parameters as one or more taper tables and adjusting at least one processing parameter in at least one of the one or more taper tables based on the adjusted processing parameters.

In various embodiments, the method includes adjusting a taper speed processing parameter in at least one of the one or more taper tables.

In various embodiments, determining differences between the measured data and the modeled data includes, from the modeled data, determining an idealized fiber taper diameter for each of a plurality of times, from the measured data, determining a resultant fiber taper diameter for each of the plurality of times, and determining a difference between the idealized taper diameter and the resultant taper diameter for one or more of the plurality of times.

In various embodiments, the method includes determining at least one taper ratio based on the difference between the idealized taper diameter and the resultant taper diameter for the one or more of the plurality of times.

In various embodiments, the method includes adjusting one or more of the processing parameters according to the at least one taper ratio.

In various embodiments, the method includes adjusting a taper speed processing parameter according to the at least one taper ratio.

In various embodiments, the processing parameters include the thermal profile of the heat source.

In accordance with the inventive concepts, provided is a method of tapering an optical fiber by a fiber tapering machine, comprising receiving fiber parameters defining taper characteristics of an optical fiber to be tapered; modeling an idealized taper based on the fiber parameters to establish modeled idealized data; from the fiber parameters, establishing fiber processing parameters for controlling aspects of the fiber tapering machine; performing a tapering operation on the optical fiber according to the processing parameters to produce a tapered resultant fiber; measuring aspects of the resultant fiber to establish measured data; determining differences between the measured data and the modeled idealized data; and adjusting and storing one or more of the processing parameters as adjusted processing parameters and/or taper table lines, based on the differences.

In various embodiments, the method can further comprise performing a next tapering operation using the adjusted processing parameters to form a new resultant tapered fiber.

In various embodiments, the method can further comprise repeating one or more steps until the differences between the measured data and the modeled data do not exceed a predetermined threshold.

In various embodiments, the method includes storing the adjusted processing parameters and/or taper table lines, in association with the key parameters for future use with other optical fibers.

In various embodiments, fiber diameter adjustments are implemented in real time as the taper is created.

In various embodiments, the taper characteristics define a shape of a taper.

In various embodiments, the processing parameters include a start diameter, a down-taper length, and a waist diameter.

In various embodiments, the processing parameters further include an up-taper length and a waist length.

In various embodiments, the processing parameters include at least one taper speed.

In various embodiments, the fiber parameters include parameters for at least one fiber holding platform's position over time.

In various embodiments, the method includes storing the processing parameters as one or more taper tables and adjusting at least one processing parameter in at least one of the one or more taper tables.

In various embodiments, the method further includes adjusting a taper speed processing parameter in at least one of the one or more taper tables.

In various embodiments, the method further includes adjusting for at least one fiber holding platform's position over time in at least one of the one or more taper tables.

In various embodiments, the method includes normalizing the measured data and the modeled data to a common axis.

In various embodiments, the method includes segmenting the modeled data into taper diameter per unit time, and determining an idealized fiber diameter for each line, determining a difference in taper diameter between the measured data and the idealized modeled data for each line, and determining a taper ratio delta for each line based on the difference in diameter for each line.

In various embodiments, the method further includes determining a taper ratio delta for each line based on the difference in diameter for each line.

In various embodiments, the method includes adjusting one or more of the processing parameters according to the taper ratio delta for each line.

In various embodiments, the method includes adjusting a taper speed processing parameter according to the taper ratio delta calculated for each table line.

In various embodiments, the method includes adjusting a fiber holding platform's position over time according to the taper ratio delta calculated for each table line.

In various embodiments, the fiber is a large diameter fiber.

In various embodiments, the fiber is a fiber bundle.

In accordance with aspects of the inventive concepts, provided is a method of tapering an optical fiber by a fiber tapering machine, comprising receiving tapering parameters defining characteristics of an optical fiber taper; modeling an idealized fiber taper based on the tapering parameters to establish modeled data; from the tapering parameters, establishing fiber processing parameters for controlling aspects of the fiber tapering machine; performing a tapering operation on the optical fiber according to the processing parameters to produce a resultant fiber taper; measuring aspects of the resultant fiber taper to establish measured data; and determining differences between the resultant fiber taper and the idealized fiber taper. Determining the differences can include determining an idealized fiber taper diameter per unit time, determining a resultant fiber taper diameter per unit time, determining a difference between the idealized taper diameter and the resultant taper diameter per unit time, and determining at least one taper ratio based on the difference between the resultant taper diameter and the idealized taper diameter at one or more times. The method can further include adjusting one or more of the processing parameters according to the at least one taper ratio and performing a next tapering operation using the adjusted processing parameters to form a new resultant fiber taper.

In accordance with another aspect of the inventive concepts, provided is a fiber tapering system, comprising a fiber holder configured to receive and maintain portions of an optical fiber, the fiber holder including at least one translatable platform, at least one heat source configured to generate a heat field arranged to heat a portion of the fiber, and a processor coupled to a memory. The processor is configured to receive fiber parameters defining taper characteristics of an optical fiber to be tapered, model an idealized fiber taper based on the fiber parameters to establish modeled data, from the fiber parameters, establish fiber processing parameters, control the heat source and the at least one translatable platform to perform a tapering operation on the optical fiber according to the processing parameters to produce a resultant fiber taper, control one or more sensors to measure aspects of the resultant fiber taper to establish measured data, determine differences between the measured data and the modeled data, and adjust one or more of the processing parameters to form adjusted processing parameters based on the differences.

In various embodiments, the processor is further configured to control the heat source and the at least one translatable platform to perform a next tapering operation using the adjusted processing parameters to form a new resultant fiber taper.

In various embodiments, the processor is further configured to determine if the differences between the measured data and the modeled data exceed a predetermined threshold and, if so, control the heat source and the at least one translatable platform to perform a next tapering operation on the resultant fiber taper according to the adjusted processing parameters to form the new resultant fiber taper.

In various embodiments, the processor is further configured to store the adjusted processing parameters in association with the fiber parameters for future use with other optical fibers.

In various embodiments, the taper characteristics define a shape of a taper.

In various embodiments, the processing parameters include a start diameter, a down-taper length, and a waist diameter.

In various embodiments, the processing parameters further include an up-taper length and a waist length.

In various embodiments, the processing parameters include at least one taper speed.

In various embodiments, the fiber parameters include parameters for at least one fiber holding platform's position over time.

In various embodiments, the processing parameters include a thermal profile of the heat source.

In various embodiments, the processor is further configured to store the processing parameters as one or more taper tables and adjust at least one processing parameter in at least one of the one or more taper tables based on the adjusted processing parameters.

In various embodiments, the processor is further configured to adjust a taper speed processing parameter in at least one of the one or more taper tables.

In various embodiments, the processor is further configured to normalize the measured data and the modeled data to a common axis to determine differences between the measured data and the modeled data.

In various embodiments, the processor is further configured to segment the modeled data into taper diameter per unit time, and determine an idealized fiber diameter for each line, segment the measured data into taper diameter per unit time, and determine a resultant fiber diameter for each line, and determine a difference in diameter between the measured data and the modeled data for one or more times.

In various embodiments, the processor is further configured to determine a taper ratio delta for each line based on the difference in diameter for the one more times.

In various embodiments, the processor is further configured to adjust one or more of the processing parameters according to the taper ratio delta for the one more times.

In various embodiments, the processor is further configured to adjust a taper speed processing parameter according to the taper ratio delta for the one or more times.

In various embodiments, the processor is further configured to generate a table of processing parameters based on the fiber parameters.

In various embodiments, the processor is further configured to update one or more parameters in the table of processing parameters based on one or more of the adjusted processing parameters.

In various embodiments, the processor is configured to plot fiber diameter over length to establish the measured data.

In various embodiments, the processor and one or more sensors are configured to collect fiber diameter over length data in real time as the taper is created.

In various embodiments, the fiber is a large diameter fiber.

In various embodiments, the fiber is a fiber bundle.

In accordance with another aspect of the inventive concepts, provided is a method of tapering an optical fiber by a fiber tapering machine having at least one processor, memory, a heat source, at least one fiber holder, and or more sensors. The method comprises receiving fiber parameters defining taper characteristics of an optical fiber to be tapered, modeling an idealized fiber taper based on the fiber parameters to establish modeled data by the processor, establishing processing parameters from the fiber parameters for controlling aspects of the fiber tapering machine, by the processor, performing a tapering operation on the optical fiber according to the processing parameters to produce a resultant fiber taper, the tapering operation performed by applying heat from the heat source to a portion of the fiber while translating a fiber holder to which the fiber is coupled, measuring aspects of the resultant fiber taper to establish measured data with the one or more sensors, determining differences between the measured data and the modeled data by the processor, and adjusting one or more of the processing parameters to form adjusted processing parameters based on the differences, by the processor.

In various embodiments, the method further comprises performing a next tapering operation using the adjusted processing parameters to form a new resultant fiber taper.

In various embodiments, the method further comprises repeating one or more of steps until the differences between the measured data and the modeled data do not exceed a predetermined threshold.

In various embodiments, the method further comprises storing the adjusted processing parameters in a memory in association with the fiber parameters for future use with other optical fibers.

In various embodiments, the taper characteristics define a shape of a taper.

In various embodiments, the processing parameters include a start diameter, a down-taper length, and a waist diameter.

In various embodiments, the processing parameters include an up-taper length and a waist length.

In various embodiments, the processing parameters include at least one taper speed.

In various embodiments, the method further comprises adjusting the taper speed processing parameter as an adjusted processing parameter.

In various embodiments, the processing parameters include a thermal profile of a heat source.

In various embodiments, the method further comprises storing the processing parameters in a memory as one or more taper tables and adjusting at least one processing parameter in at least one of the one or more taper tables based on the adjusted processing parameters.

In various embodiments, determining differences between the measured data and the modeled data includes normalizing the measured data and the modeled data to a common axis.

In various embodiments, determining differences between the measured data and the modeled data includes segmenting the modeled data into taper diameter per unit time and determining an idealized fiber diameter for each unit time, segmenting the measured data into taper diameter per unit time and determining a resultant fiber diameter for each unit time, and determining a difference in diameter between the measured data and the modeled data for one or more times.

In various embodiments, the method further comprises determining a taper ratio delta based on the difference in diameter between the measured data and the modeled data for the one more times.

In various embodiments, adjusting one or more of the processing parameters includes adjusting one or more of the processing parameters according to the taper ratio delta for each of the one or more times.

In various embodiments, adjusting one or more of the processing parameters includes adjusting a taper speed processing parameter according to the taper ratio delta for each of the one or more times.

In various embodiments, establishing the measured data includes plotting fiber diameter over length.

In various embodiments, the measuring aspects of the resultant fiber taper to establish measured data is performed in real time.

In various embodiments, the fiber is a large diameter fiber or a fiber bundle.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 2 is a set of taper tables generated from user input key parameters via the user interface of FIG. 1, in accordance with the prior art;

DETAILED DESCRIPTION OF PREFERRED EMBODIMENTS

Figure 1:
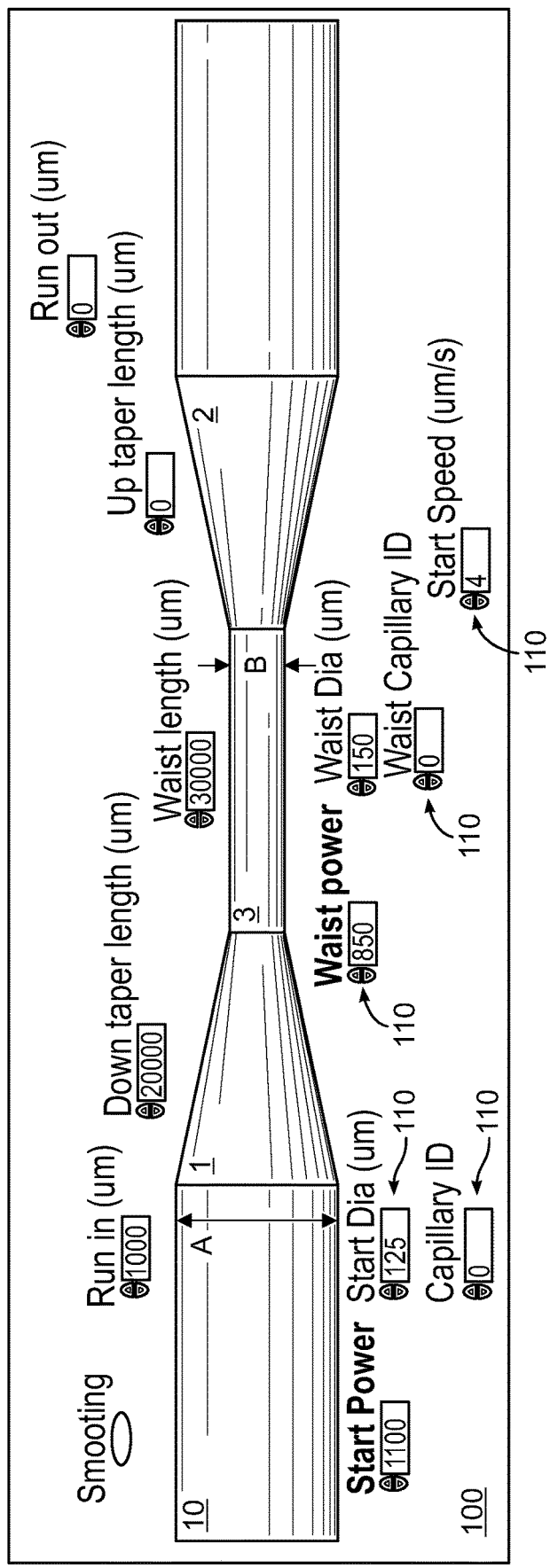
FIG. 1 is an embodiment of a user interface screen of a tapering machine configured for inputting key parameter for tapering an optical fiber, in accordance with the prior art.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

Figure 4:
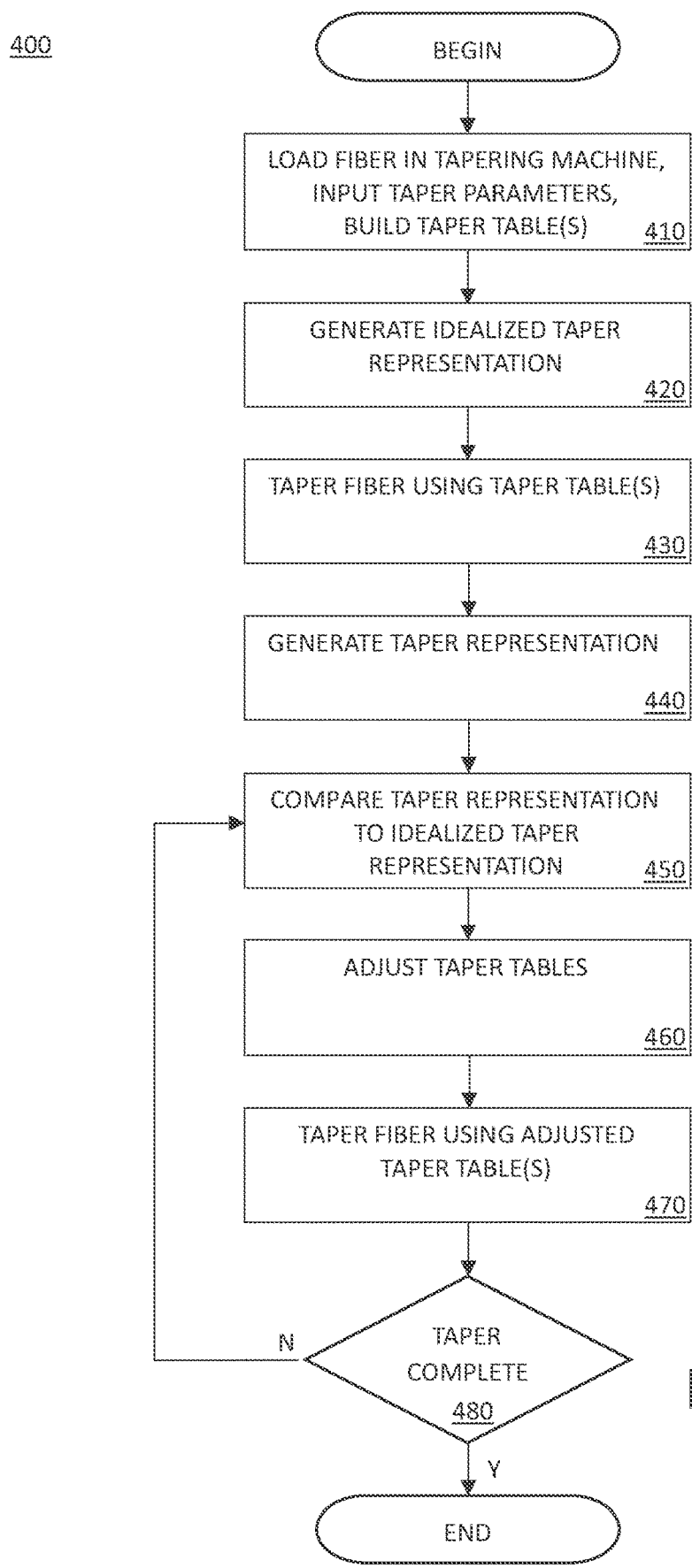
FIG. 4 is a flowchart of an improved method of making a fiber taper, in accordance with aspects of the inventive concepts.
Figure 5:
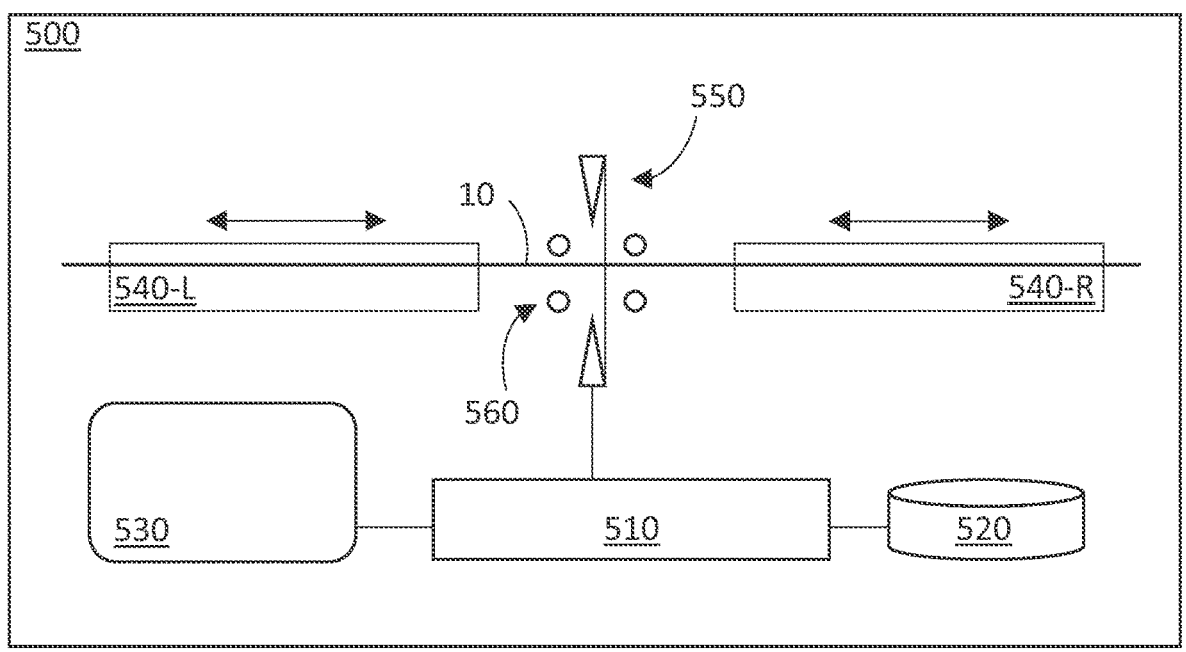
FIG. 5 is a block diagram of an improved tapering machine, in accordance with aspects of the present inventive concepts.

FIG. 4 is a flowchart of an improved method of making a fiber taper, in accordance with aspects of the inventive concepts. FIG. 5 is a block diagram of a tapering machine configured to execute the method of FIG. 4.

Method 400 of FIG. 4 begins and a fiber (or at least one fiber) 10 is loaded into the tapering machine 500 of FIG. 5. The fiber can be fiber of a standard diameter, large diameter of a fiber bundle. Loading the fiber 10 into the tapering machine 500 includes removably coupling the fiber to a fiber holder that can have one or more platforms, including at least one translatable platform. The fiber holder is configured to receive and maintain two portions of an optical fiber 10. In an example embodiment, the fiber holder includes a right platform and a left platform, 540-R and 540-L, respectively. If both platforms are translatable, the translation of each platform can be independently controlled, e.g., with each platform translated by its own motor(s). For example, the translatable platforms and heat source can be driven by one or more motors to move in different directions and/or at different speeds. As will be understood by those skilled in the art, single direction tapering and bidirectional tapering will use different platform translation schemes.

The (pre-tapered) fiber 10 is loaded so that a portion to be tapered is disposed between the platforms such that the intermediate portion can be heated by at least one heat source 550. The at least one heat source 550 is configured to generate a heat field or zone arranged to heat the intermediate portion of the fiber to be tapered. As an example, the heat source 550 can comprise 2 or more electrodes arranged around or near the fiber 10 to generate the heat field in response to input power and/or current. As a second example, the heat source 550 can comprise a filament arranged around or near the fiber 10 to generate the heat field in response to input power and/or current. As a third example, the heat source 550 can comprise a $CO_2$ or other laser source to generate a heat field in response to input power and/or current. Other heat sources could also suffice.

In some embodiments, the heat source 550 can comprise a plurality of heat source stages, each heat source stage can be configured to generate heat for heating the fiber 10. In the case of a plurality of heat sources, each heat source stage could be independently controlled. An independently controlled heat source stage can receive a different input power and be turned on and off at different times than other heat source stages. The heat source 550 can be stationary in some embodiments or translatable, e.g., along the fiber axis, in other embodiments. The fiber axis can be defined as a straight line running lengthwise within a center of the portion of the fiber being tapered.

The tapering machine 500 can include at least one processor 510 having access to at least one computer memory 520. The computer memory 520 can be configured to store program code and instructions executable by the processor 510 to implement the method 400 of FIG. 4. A user interface subsystem or device 530 can be coupled to the processor 510 to render and control user interface displays, icons, and/or signals output via one or more screens and/or other output devices. The processor 510 can also be configured to receive and process user inputs entered from one or more user input devices, such as a touchscreen, keyboard, mouse, light pen, and/or wireless device, as examples. The user input devices can form part of the user interface subsystem 530 included as part of the tapering machine 500. In some embodiments, the processor 510 can also process signals received from a remote device, such as an external memory, communications link, and/or wireless device. And, in some embodiments, the processor 510 can communicate signals to remote devices for output and/or processing. In some embodiments, such remote device can be considered to be an extension of the user interface subsystem 530 and/or tapering machine.

Once the fiber is loaded into the tapering machine, in step 410 of FIG. 4, tapering parameters (or key fiber parameters) are input, e.g., via the user interface subsystem 530. The fiber parameters define taper characteristics of an optical fiber to be tapered, such as the loaded optical fiber 10. The taper characteristics can define a shape of the desired taper, such as run-in length, start diameter, down-taper length, waist diameter, waist length, up-taper length, and/or run-out length. The taper characteristics can also define start speed, start power, and/or waist power for making the taper.

The processor 510 receives the fiber parameters and generates processing parameters used to control hardware and/or software of the tapering machine to perform a tapering operation. In some embodiments, the processor generates one or more taper table(s) comprising the processing parameters and stores the taper tables in memory 520. In some embodiments, the user inputs and/or taper table(s) can be provided via an external device that is linked or coupled to the tapering machine 500 (or processor 510).

The taper tables define processing parameters for controlling hardware and/or software aspects of the tapering machine 500, such as platforms 540-R and 540-L translation direction, speed, and timing and heat source 550 power and translation (if any). The taper tables 200 of FIG. 2 give examples of initial taper tables that can be generated by processor 520 based on user inputs received via the user interface subsystem 530.

In step 420, the processor 510 generates an idealized taper representation based on the received key fiber parameters, which include parameters defining physical characteristics of the desired, idealized taper. The processor models the idealized taper diameter over length based on the key parameters. That is, in this step, the idealized shape of the resultant taper is modeled, and saved as modeled data. An example of an idealized representation of a tapered fiber (single direction) is shown in the plot 600 of FIG. 6.

In step 430, the fiber 10 is tapered by the tapering machine 500 using the initial processing parameters, which may be in the form of one or more taper tables. In the method 400 of FIG. 4, step 430 could be performed before step 420. The tapering operation produces a tapered resultant fiber.

Below is an example of code that could be used for tapering a fiber:

Definitions

Rin Run-In distance
DT Down-taper length
WL Waist Length
UT Up-taper length
Rout Run-Out distance
SD Starting Diameter
WD Waist Diameter
WL Waist Length
D Diameter
Z A motor position D Diameter Function D(Apos)

$0 \leq Z < Rin; D=SD$ $Rin \leq Z < (DT+Rin); D=SD-((Z-Rin)/DT)*(SD-WD)$ $(DT+Rin) \leq Z < (Rin+DT+WL); D=WD$ $(DT+Rin+WL) \leq Z < (Rin+DT+WL+UT); D=SD-((Rin+DT+WL+UT-Z)/UT)*(SD-WD)$ $(Rin+DT+WL+UT) \leq Z < (Rin+DT+WL+UT+Rout); D=SD$ $(Rin+DT+WL+UT+Rout) \leq Z;$ [Process Terminates]

Figure 3:
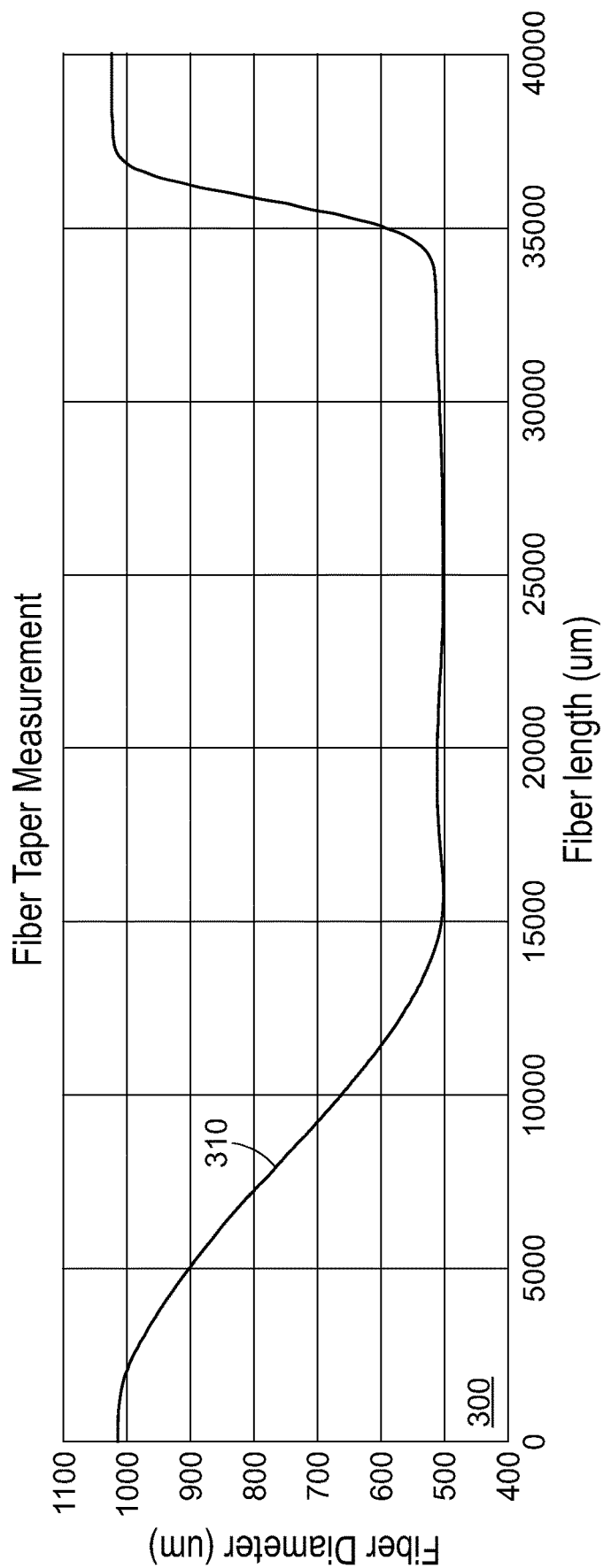
FIG. 3 is a graph showing a plot of measurements of a taper made using the taper tables of FIG. 2, in accordance with the prior art.

In step 440, one or more sensors 560 are used to measure the physical dimensions of the taper of the resultant fiber to determine measured taper diameter over length per unit time (e.g., 50 ms time unit). FIG. 3 shows an example of a taper of the resultant fiber processed using the initial processing parameters (or initial taper tables). Such sensors can include, for example, various types of cameras or other imaging devices.

Figure 6:
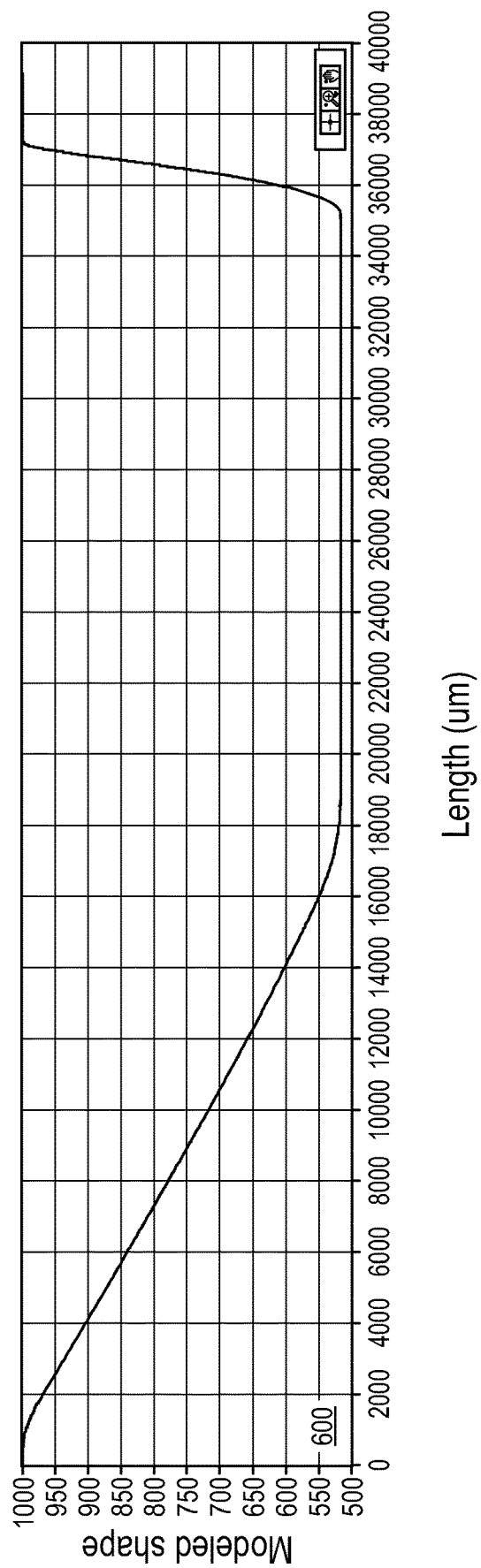
FIG. 6 is a graph showing a plot of an idealized fiber according to the method of FIG. 4.

In step 450, the processor 510 compares and analyzes the measured data from the resultant fiber taper (FIG. 3) obtained using sensors 560 with the modeled idealized taper representation (FIG. 6). From the comparison and analysis, differences between the measured data and modeled data are determined. In a preferred embodiment, the differences between the measured data and the modeled data are determined by converting or normalizing the measured data and modeled data to a common x-axis representing a unit of measure. Preferably, differences in diameter over length are determined by comparing the idealized taper with the resultant fiber taper. For example, in step 450, the measured data can subtracted from the modeled data to determine a difference in diameter at various points along the taper length.

FIG. 6 shows a plot of the modeled shape determined by the processor based on the user input fiber parameters. In FIG. 6, the diameter of the modeled shape (y-axis) is plotted with respect to the fiber length (x-axis). The resultant fiber taper achieved using the same input fiber parameters is shown in FIG. 3.

The differences in the taper diameters between the modeled data and the measured data can be correlated to the processing parameters used to generate the taper of the resultant fiber taper. The correlation can be done on a per unit time basis. For example, in the exemplary taper tables of FIG. 2, each line represents processing for a unit of time, e.g., 50 ms. Given that the tables include the translation speeds, time units and fiber length can be correlated.

Accordingly, diameter over fiber length can be correlated to time or units of time, which are represented as lines in the taper tables.

Accordingly, the modeled data can be segmented into taper diameter per unit time to determine an idealized fiber diameter for each unit time. Similarly, the measured data can be segmented into taper diameter per unit time to determine a resultant fiber diameter for each unit time. A difference in diameter between the measured data and the modeled data can be determined for one or more times or time units.

"Taper ratio" is commonly defined as the ratio of a start diameter to a waist diameter in a tapered fiber. In the context of a "taper table," as used herein, the taper ratio is the ratio between the starting diameter and the diameter within the heat zone at that point, e.g., a point in time, or a location, or a table line count. In simple terms, the "delta" is the difference between the idealized taper diameter versus the resultant taper diameter at a given point.

In various embodiments, the taper ratio concept can be stated in any of the following ways:
a. The difference between the taper ratio created during a specific time (table line) while creating a taper, and what the idealized taper ratio should have been, during that same time slot;
b. The difference between the diameter created during a specific time (table line) while creating a taper, and what the idealized taper diameter should have been, during that same time slot;
c. The difference between the taper ratio created at a specific location within the taper (table line), and what the idealized taper ratio should have been, at that location; and
d. The difference between the diameter created at a specific location within the taper (table line), and what the idealized taper diameter should have been, at that location.

In a preferred form, approach "a." above is used.

The reason that any of the above concepts can be valid is because the table line not only represents units of time, but also the position within the taper, being created during that unit time. Each line in a taper table represents a fixed amount of time. Each table line contains speeds for all the motors during that duration of time. Therefore, the motor locations and/or translations during a particular table line is equal to the sum of speed×time for all the preceding table lines. In conclusion, a "table line" represents, a unit of time during a tapering process, a position within the taper being created, the taper ratio being created during that unit time, and the taper ratio being created at that location. The "delta" or "taper ratio delta" is a measure of how much each table line needs to change to better approximate the idealized version of a given taper. For example, a taper ratio delta can be the difference between the taper ratio of a resultant fiber taper and the taper ratio of the idealized fiber taper at a corresponding location along the length of the fibers.

Figure 7:
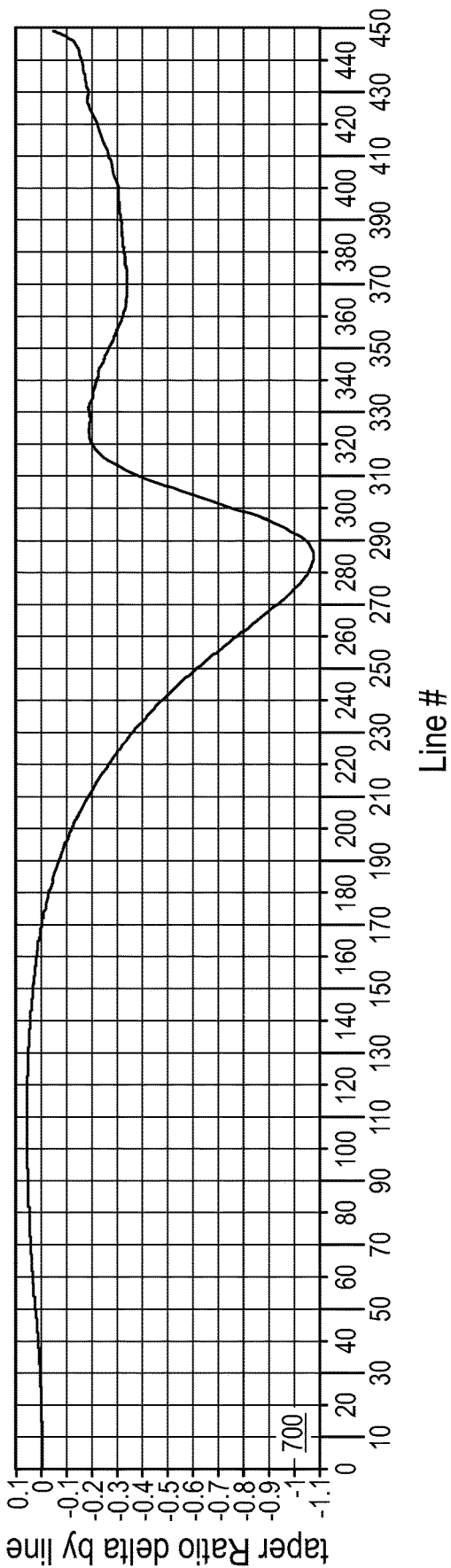
FIG. 7 is a graph showing a plot of data correlation and alignment of the graphs of FIG. 3 as compared to the idealized graph of FIG. 6.

FIG. 7 is a graph showing data correlation of the differences between measured and modeled data as a plot of a taper ratio delta (or differences) per line (or unit time). In FIG. 7, therefore, the x-axis is line number and the y-axis represents a taper ratio delta by line, where the line number can represent a unit of time from the taper tables.

Figure 8:
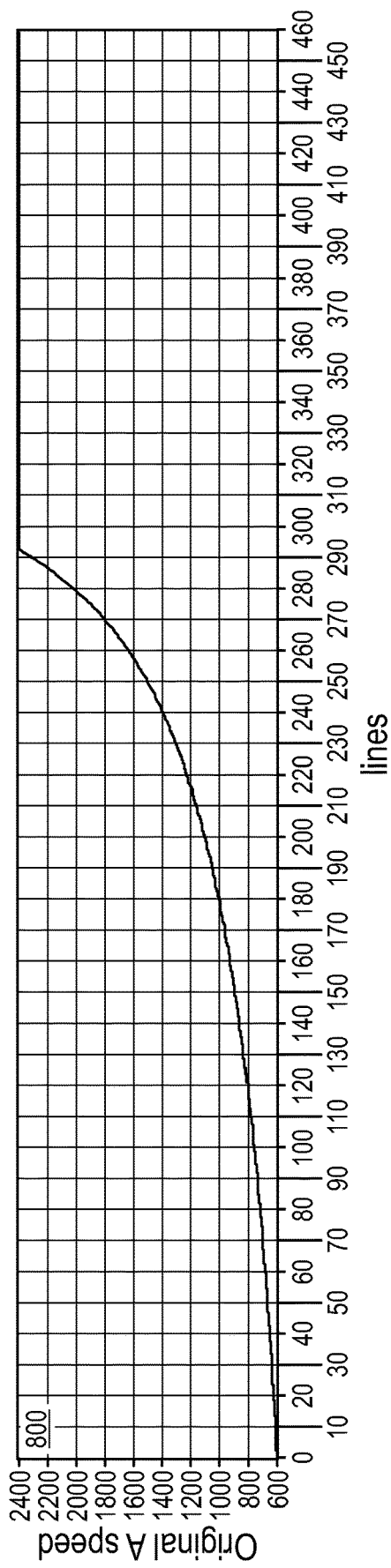
FIG. 8 shows a set of graphs showing plots of original tapering speed and modified tapering speed required according to the graph of FIG. 7.
Figure 8:
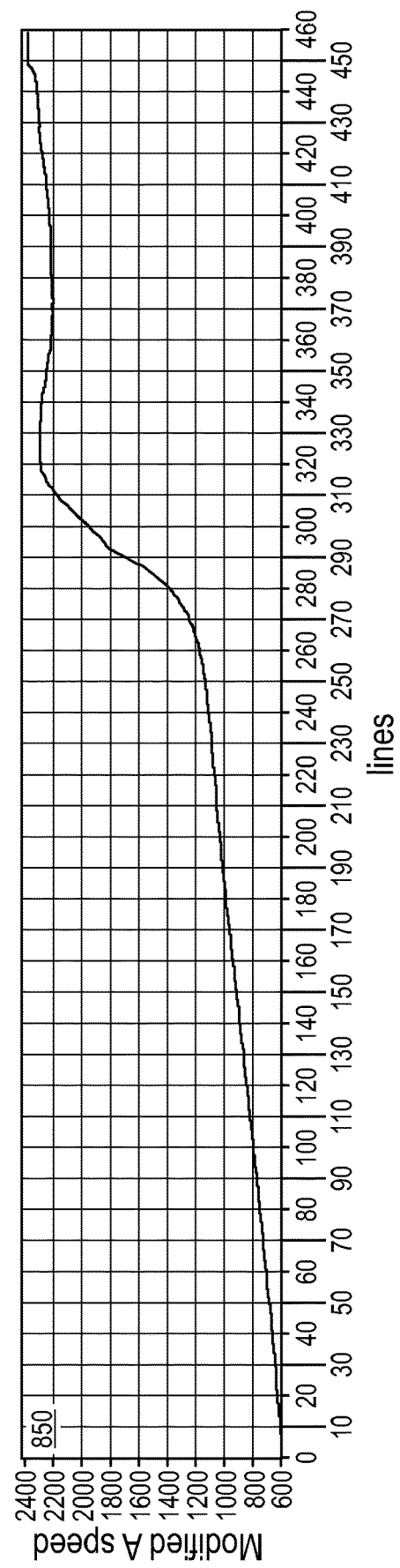

FIG. 8 shows a set of graphs demonstrating the modifications required to the taper tables according to the graph of FIG. 7. Graph 800 is a plot of the original speed of the original taper platform(s) 504-R and/or 540-L for each line (unit of time). Graph 850 is a plot of a modified speed per line, which is derived or calculated from the data of FIG. 7.

Based on the difference data, or taper ratio deltas by line, required processing parameters adjustments are determined. For example, the difference data, or taper ratio deltas by line, may indicate that an adjustment is needed to a taper speed processing parameter, which can be stored in one or more taper tables.

Once the modified speeds are calculated in step 450, the required speed changes to the original processing parameters (e.g., taper tables) are determined based on the differences between the measured data and the modeled data and the processing parameters (e.g., taper tables) are adjusted, in step 460. For example, a taper speed can be adjusted in the taper tables.

In step 470, the tapering machine again tapers the fiber 10 using the adjusted processing parameters (e.g., taper tables). In some embodiments, the adjusted processing parameters (e.g., taper tables) can be stored and used as processing parameters (e.g., taper tables) for a new fiber having the same original input key parameters entered for tapering fiber 10.

In step 480, the sensors 560 can be used to measure the resultant fiber taper, which has been processed using the adjusted (corrected) taper tables. The resultant fiber taper can be measured and compared to the idealized taper to determine if another adjustment iteration is necessary. The determination can be based on a number of different considerations relating to the physical form of the resultant fiber taper. For example, a comparison of the taper diameter per line of the tapered fiber as compared to the idealized taper diameter per line can be performed and/or analysis of taper ratio deltas (or difference) per line (see FIG. 7) of the tapered fiber and the idealized fiber can be used. In such cases, one or more thresholds can be used to determine if the corrected taper is sufficiently precise. For example, a threshold could be the taper ratio delta of the resultant fiber taper as compared to the idealized fiber taper, where if the taper ratio delta does not exceed or is below a predetermined value, e.g., +/−0.2, the resultant fiber taper is deemed to be of sufficient quality and precision. If the threshold is exceeded in step 480, the process can return to step 450 for another iteration, for example.

Figure 9:
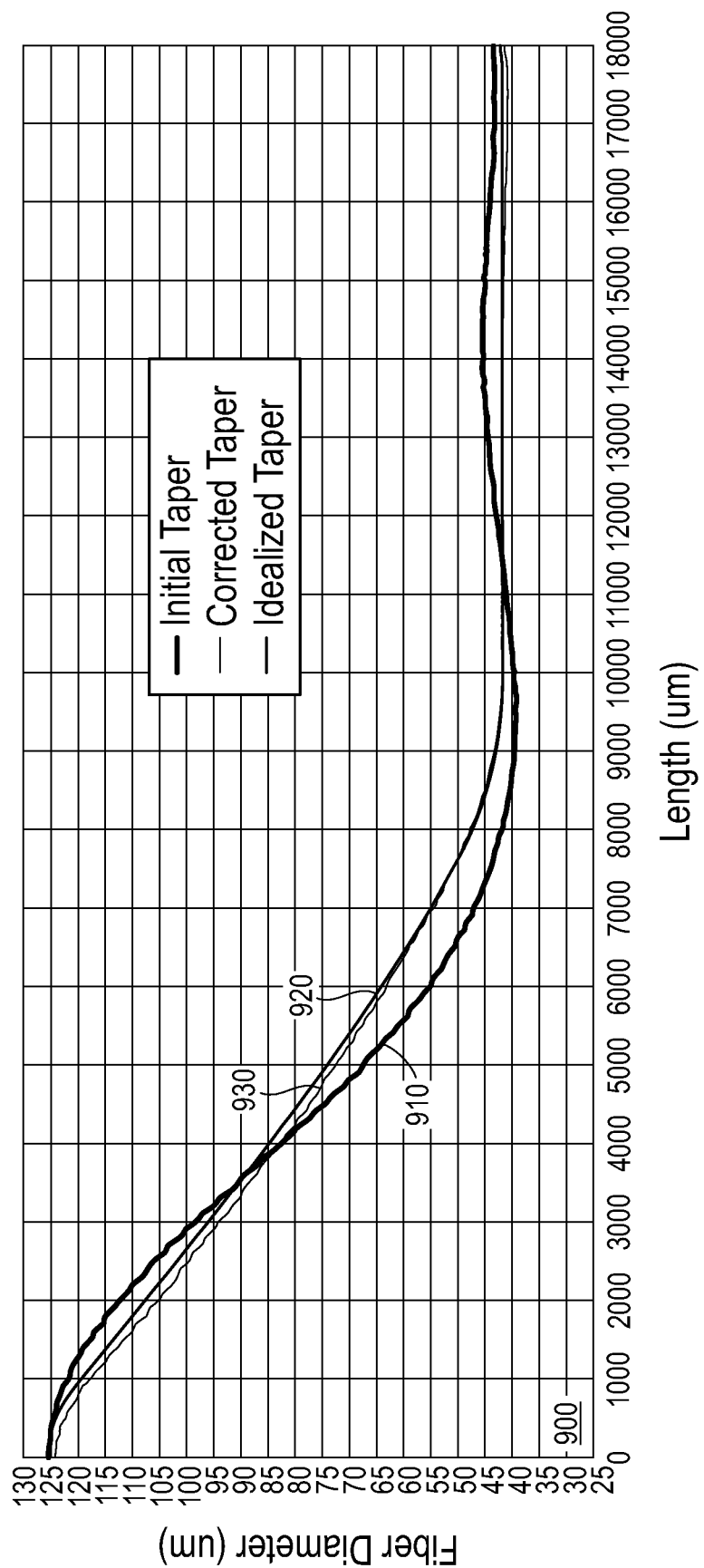
FIG. 9 shows a graph having plots of the initially tapered fiber, the idealized taper, and a corrected taper.

FIG. 9 shows a graph having three plots, one of an initial resultant fiber taper 910, one of an idealized fiber taper 920, and one of a final resultant fiber taper 930 corrected using the method of FIG. 4 and the tapering machine of FIG. 5. As can be seen, the corrected resultant fiber taper 930 is much closer to the idealized fiber taper 920 than the initial resultant fiber taper 910. The method 400 and system 500 provide better quality tapers that precisely conform to user specifications. Using such method and system also saves time and conserves resources, because they produce high quality taper more quickly than present methods and systems.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A self-learning fiber tapering system, comprising:
   at least one processor, a computer memory, at least one heat source, at least one fiber holder, and one or more sensors; and
   fiber tapering program code executable by the at least one processor to:
   process received fiber parameters to define taper characteristics in the form of physical dimensions of a desired resultant fiber taper of an optical fiber;
   model and store a shape of the desired resultant fiber taper based on the received fiber parameters to establish modeled data;
   establish processing parameters from the received fiber parameters useful to control the at least one fiber holder and/or the at least one heat source in a tapering operation of the optical fiber to produce a resultant fiber taper;
   use the one or more sensors to measure physical dimensions of the resultant fiber taper to establish measured data, the measured data including fiber diameter over a tapered length of the optical fiber;
   determine differences in physical dimensions between the measured data and the modeled data; and
   adjust one or more of the processing parameters to form adjusted processing parameters useful by the processor to reduce the differences in physical dimension between the modeled data and measured data of a subsequent resultant fiber taper.

2. The system of claim 1, wherein the at least one processor is further configured to:
   control the at least one fiber holder and/or the at least one heat source to perform a next tapering operation using the adjusted processing parameters to form the subsequent resultant fiber taper as second taper of the optical fiber using the adjusted processing parameters or as a taper on a different optical fiber using the adjusted processing parameters.

3. The system of claim 2, wherein the at least one processor is further configured to:
   control the at least one fiber holder, the at least one heat source, and/or the one or more sensors to repeat one or more of tapering the optical fiber, measure physical dimensions of the resultant fiber taper, determine differences in physical dimensions between the measured data and the modeled data, and adjust one or more of the processing parameters to form adjusted processing parameters until the differences between the measured data and the modeled data do not exceed a predetermined threshold.

4. The system of claim 1, wherein the at least one processor is further configured to:
   store the adjusted processing parameters in the computer memory in association with the fiber parameters for future use with other optical fibers.

5. The system of claim 1, wherein the taper characteristics define a shape of a taper.

6. The system of claim 1, wherein the processing parameters include a start diameter, a down-taper length, and a waist diameter.

7. The system of claim 6, wherein the processing parameters include an up-taper length and a waist length.

8. The system of claim 1, wherein the processing parameters include at least one taper speed.

9. The system of claim 8, wherein the at least one processor is further configured to adjust the taper speed processing parameter as an adjusted processing parameter.

10. The system of claim 1, wherein the processing parameters include a thermal profile of a heat source.

11. The system of claim 1, wherein the at least one processor is further configured to:
store the processing parameters in a memory as one or more taper tables; and
adjust at least one processing parameter in at least one of the one or more taper tables based on the adjusted processing parameters.

12. The system of claim 1, wherein the at least one processor is further configured to determine differences between the measured data and the modeled data to include normalizing the measured data and the modeled data to a common axis.

13. The system of claim 1, wherein the at least one processor is further configured to determine differences between the measured data and the modeled data to include:
segment the modeled data into taper diameter per unit time and determine an idealized fiber diameter for each unit time;
segment the measured data into taper diameter per unit time and determine a resultant fiber diameter for each unit time; and
determine a difference in diameter between the measured data and the modeled data for one or more times.

14. The system of claim 13, wherein the at least one processor is further configured to:
determine a taper ratio delta based on the difference in diameter between the measured data and the modeled data for the one or more times.

15. The system of claim 14, wherein the at least one processor is further configured to adjust one or more of the processing parameters according to the taper ratio delta for each of the one or more times.

16. The system of claim 14, wherein the at least one processor is further configured to adjust one or more of the processing parameters according to the taper ratio delta for each of the one or more times.

17. The system of claim 1, wherein the at least one processor is further configured to plot fiber diameter over length.

18. The system of claim 1, wherein the fiber is a large diameter fiber or a fiber bundle.

19. The system of claim 1, wherein the at least one processor is further configured to perform the tapering operation on the optical fiber using the processing parameters to apply heat from the at least one heat source to a portion of the optical fiber while translating the at least one fiber holder to which the optical fiber is coupled.

20. A self-learning optical fiber tapering apparatus comprising:
at least one processor, a computer memory, at least one heat source, at least one fiber holder, and one or more sensors; and
fiber tapering program code executable by the at least one processor to execute a fiber tapering method comprising:
receiving tapering parameters defining characteristics of an optical fiber taper;
computer-modeling an idealized fiber taper based on the fiber parameters to establish modeled data;
from the tapering parameters, establishing fiber processing parameters for controlling aspects of the fiber tapering machine;
performing a tapering operation on the optical fiber according to the processing parameters to produce a first resultant fiber taper;
measuring aspects of the first resultant fiber taper to establish measured data, including collecting fiber diameter over length data in real time as the first resultant fiber taper is created using one or more sensors;
determining differences between the first resultant fiber taper and the idealized fiber taper, including:
from the modeled data, determining an idealized fiber taper diameter per unit time;
from the measured data, determining a resultant fiber taper diameter per unit time;
determining a difference between the idealized taper diameter and the resultant taper diameter per unit time; and
determining at least one taper ratio based on the difference between the resultant taper diameter and the idealized taper diameter at one or more times;
adjusting one or more of the processing parameters according to the at least one taper ratio; and
performing a next tapering operation using the adjusted processing parameters to form a second resultant fiber taper of the optical fiber or a resultant fiber taper on a different optical fiber.

* * * * *